United States Patent [19]
Furlani et al.

[11] Patent Number: 5,608,484
[45] Date of Patent: Mar. 4, 1997

[54] ELECTROMAGNETIC CAMERA SHUTTER

[75] Inventors: Edward P. Furlani, Lancaster; William Mey, Rochester; Thomas M. Stephany, Churchville; J. Kelly Lee, Brighton, all of N.Y.

[73] Assignee: Eastman Kodak Company, Rochester, N.Y.

[21] Appl. No.: 628,070

[22] Filed: Apr. 4, 1996

[51] Int. Cl.$^6$ .................................................. G03B 9/36
[52] U.S. Cl. ................................. 396/463; 396/491
[58] Field of Search ........................ 354/234.1, 235.1, 354/245, 248

[56] References Cited

U.S. PATENT DOCUMENTS

| | | | |
|---|---|---|---|
| 3,049,982 | 8/1962 | Kendall | 354/234.1 |
| 3,282,187 | 3/1965 | Cassidy et al. | 354/230 |
| 3,797,919 | 3/1974 | McClenahan | 359/231 |
| 4,024,552 | 5/1977 | Kondo | 354/234.1 |
| 4,333,722 | 6/1982 | Lee | 354/234.1 |
| 4,514,064 | 4/1985 | Kurosu et al. | 354/234.1 |
| 4,514,065 | 4/1985 | Carrera | 354/235.1 |
| 4,650,307 | 3/1987 | Capobianco et al. | 354/234.1 |
| 4,671,638 | 6/1987 | Capobianco et al. | 354/234.1 |
| 4,724,452 | 2/1988 | Mody et al. | 354/234.1 |

*Primary Examiner*—A. A. Mathews
*Attorney, Agent, or Firm*—Edward Dugas

[57] ABSTRACT

An electromagnetic camera shutter including an electrically conductive shutter blade and electrically conductive springs for urging the shutter blade into a first or a second position from a compressed position between the first and the second position. A permanent magnet is associated with said shutter blade and a control device applies a current through the springs and the shutter blade in a first direction to generate an electromagnetic field between the shutter blade and the permanent magnet so as to move the shutter blade from the first position to the second position and alternately, applies a current through the springs and the shutter blade in a second direction so as to move the shutter blade from the second position to the first position.

5 Claims, 3 Drawing Sheets

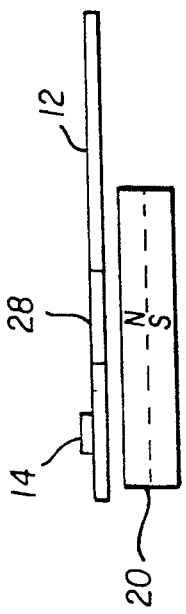
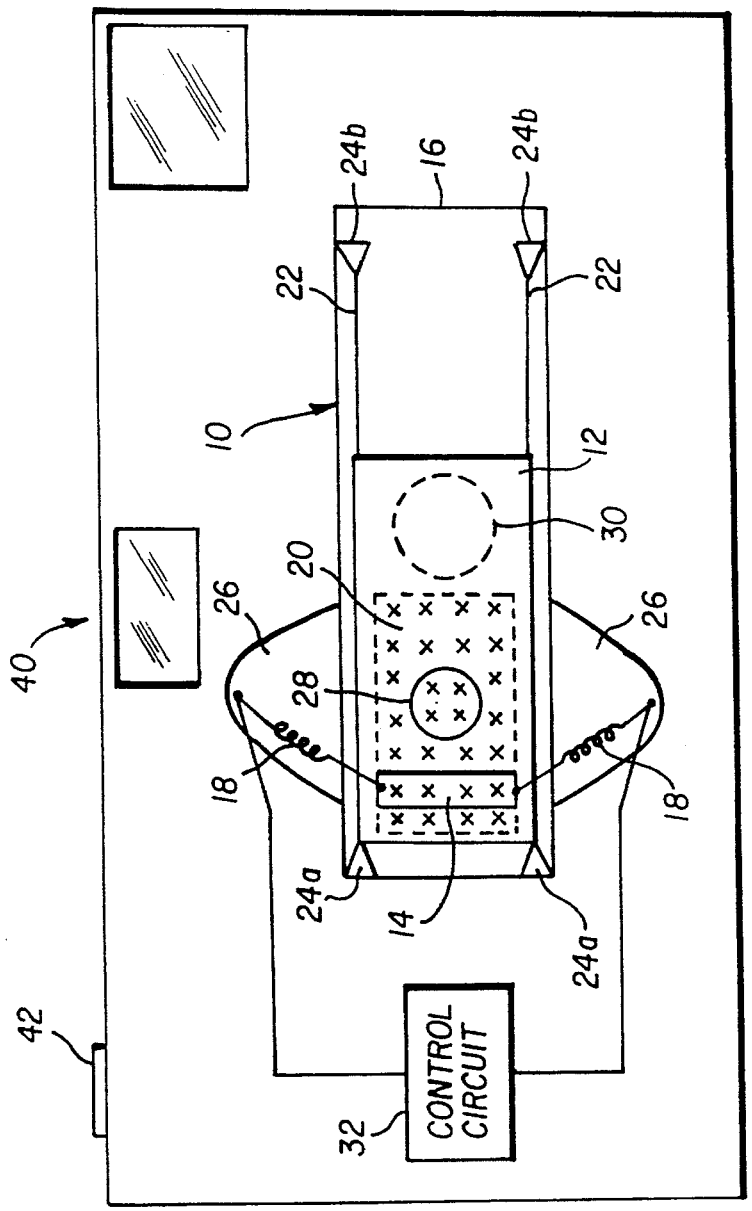
FIG. 1A
FIG. 1B

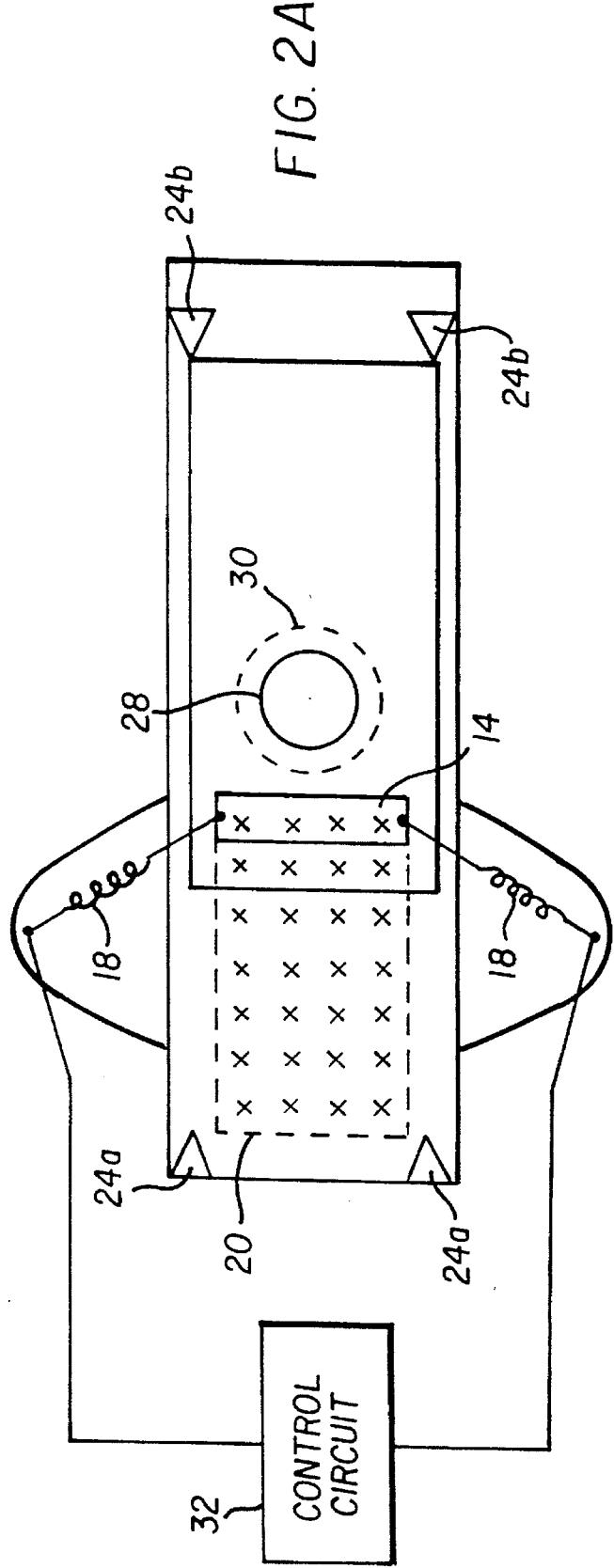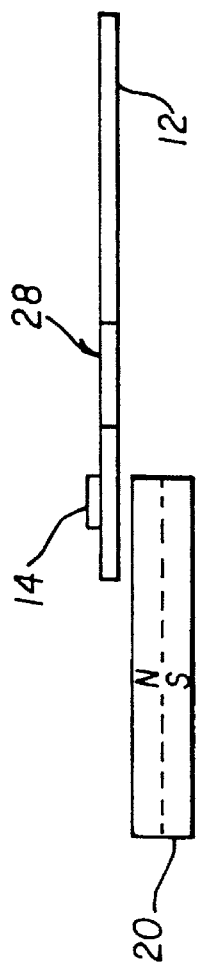

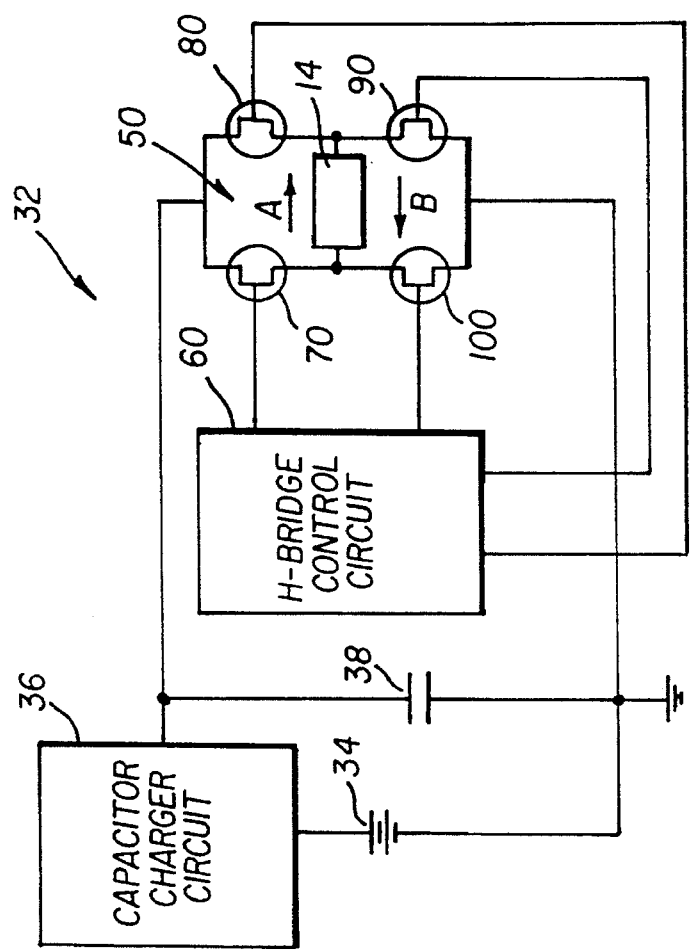
FIG. 4
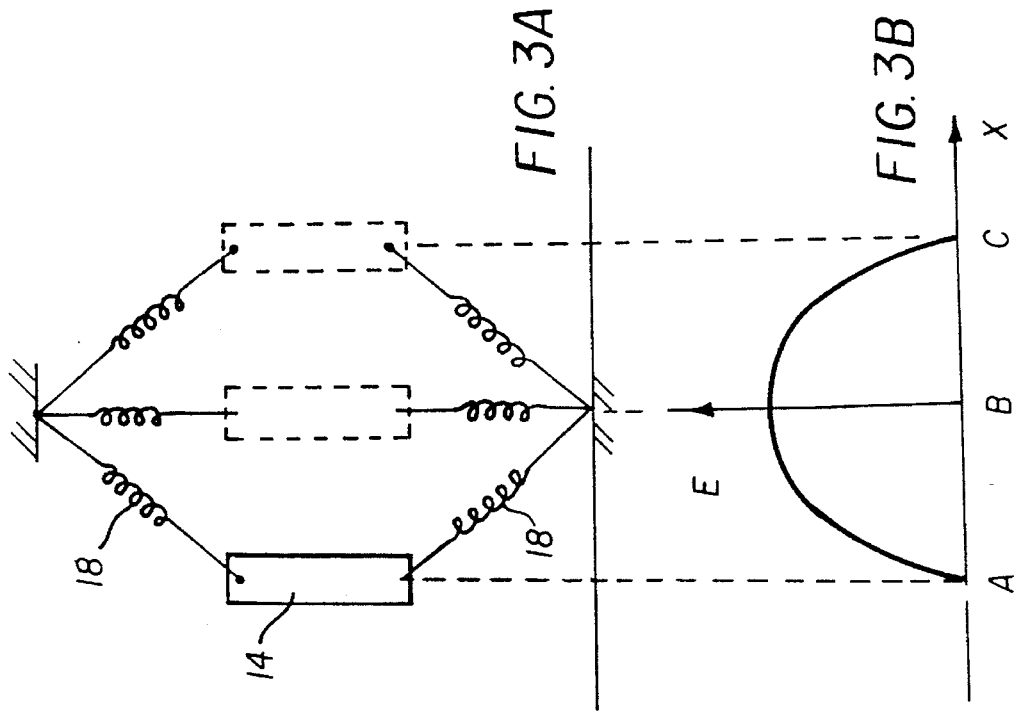
FIG. 3A
FIG. 3B

ELECTROMAGNETIC CAMERA SHUTTER

CROSS REFERENCE TO RELATED APPLICATION

Reference is made to and priority claimed from U.S. Provisional application Ser. No. 60/001,137, filed 13 Jul. 1995, entitled ELECTROMAGNETIC CAMERA SHUTTER.

FIELD OF INVENTION

This invention relates to the field of camera shutters and more particularly to an electromagnetic shutter.

BACKGROUND OF THE INVENTION

Electromagnetic actuators are routinely used for high speed camera shutters. These actuators typically consist of permanent-magnets, coils, and soft-magnetic materials that guide and focus the magnetic flux. The shutter blades are attached to a moving member which, in part, consists of a magnet or coil. The shutter is activated (opened or closed) when the moving member is subjected to a "drive" field which is provided by an additional field source (coil or magnet). Current is provided to the field source through wires that perform no secondary function. Inexpensive cameras require a shutter that is reliable, but also minimally expensive to fabricate. Towards that end if a part can be made to perform more than one function a reduction in cost will follow.

SUMMARY OF THE INVENTION

The present invention is directed to overcoming one or more of the problems set forth above. Briefly summarized, according to one aspect of the present invention there is provided an electromagnetic camera shutter comprising:

an electrically conductive shutter blade; electrically conductive spring means for urging said shutter blade into a first or a second position from a compressed position between said first and said second position;

permanent magnet means associated with said shutter blade; and control means for applying a current through said springs and said shutter blade in a first direction to generate an electromagnetic field between said shutter blade and said permanent magnet so as to move said shutter blade from said first position to said second position and for applying a current through said springs and said shutter blade in a second direction so as to move said shutter blade from said second position to said first position.

ADVANTAGEOUS EFFECT OF THE INVENTION

The main advantage of this shutter is that it consists of a minimum number of parts, a magnet, shutter blade and the electronic drive circuitry. The simplicity of the design translates into reduced cost and higher reliability making this suitable for low cost single use cameras. In addition, there is no need for soft-magnetic circuit elements or coils of wire that are common to most other shutter actuators. Therefore, this shutter will weigh less than conventional electromagnetic shutters.

BRIEF DESCRIPTION OF THE DRAWINGS

FIGS. 1A, and 1B, are a cut-away front view of a camera with the shutter in place, and a side view of portions of the shutter, respectively;

FIGS. 2A, and 2B, illustrate the shutter in its opened state in a front and a side view, respectively;

FIGS. 3A, and 3B illustrate the range of motion of the springs connected to the shutter, and the spring energy as a function of the range of motion, respectively; and FIG. 4, illustrates in schematic form the circuitry for controlling the shutter of the present invention.

DETAILED DESCRIPTION OF THE INVENTION

Referring to FIGS. 1A and 1B, wherein an example of a preferred shutter 10 is shown. The shutter employs a shutter blade 12 with shutter opening 28, that is slidably mounted in a shutter frame 16 to be guided along two guide grooves 22. The shutter blade 12 is held in abutment with shutter stops 24A and 24B by means of electrically conductive springs 18, when the shutter is closed and opened, respectively. The shutter blade 12 has mounted thereon a conductive strip 14. The conductive strip generates a magnetic field when current flows there through. The conductive strip 14 is electrically connected in series circuit to a pair of conductive springs 18 which are physically connected to the shutter frame 16 by means of tabs 26. A permanent magnet 20 is mounted on the shutter frame 16 beneath the shutter blade 12. When the conductive strip 14 is energized the shutter blade 12 is moved to the right by means of the electromagnetic force produced between the conductive strip 14 and the permanent magnet 20. As the shutter moves to the right the springs 18 are compressed from their initial natural length to a point of maximum compression after which the springs 18 decompress to force the shutter to continue to the right until stopped by the stops 24B (shown in FIG. 3).

FIGS. 2A and 2B illustrate the position of the shutter 14 in the opened position. Thus, by energizing the conductive strip 14 the shutter blade 12 is slid in the direction that opens a light passage through shutter opening 28 and the camera's lens opening 30 to expose film within a camera 40. After the shutter is opened it is held against the stops 24B by the natural length of springs 18. The duration of this open condition is controlled by the control circuit 32, illustrated in detail in FIG. 4. A reversal of current through the conductive strip 14 will cause the shutter 12 to move to the left. As the shutter moves to the left the springs 18 are again compressed from their initial natural length to a point of maximum compression after which the springs 18 decompress to force the shutter to continue to the left until stopped by the stops 24A.

Referring to FIGS. 3A and 3B, the spring energy, as a function of shutter position, is illustrated. When the springs 18 are at position A they are at their natural length with substantially no spring energy. As the springs are forced to position B (via activation of conductive strip 14) they are compressed, thereby increasing the spring energy. The springs acquire their maximum spring energy at position B. As the springs continue to move to the right from position B to position C, they decompress, expending their energy, thereby forcing the conductive strip 14 (and attached shutter blade 12, not shown) to the right. At position C, the springs are once again at their natural length and the spring energy is substantially zero. Thus, for example, to open the shutter, the conductive strip 14 need only be energized to move the springs from position A to position B after which the springs themselves force the shutter to complete the opening to position C. The aforementioned procedure is reversed by reversing the current flow through the conductive strip 14 to force the shutter back from position C to position A.

Referring to FIG. 4, the shutter drive circuitry 32 is diagrammed. The camera battery 34, feeds the charger circuit 36, which in turn charges capacitor 38, to an energy level which is sufficient to power a complete shutter cycle. The capacitor 38 is also connected to H-Bridge 50, which is controlled by the H-Bridge control circuitry 60. This H-Bridge is comprised of transistors 70, 80, 90, and 100. Upon the control circuitry 60 receiving a command to actuate the shutter blade 12, transistors 70 and 90 are turned "on". This action sends current through the conductive strip 14 in a direction A to open the shutter. The exposure on the camera's film thus made, transistors 70 and 90 are turned "off", and transistors 80 and 100 are turned "on". This action sends current through the conductive strip 14 in a direction B, which, in turn, closes the shutter. The charging circuit 36, then recharges capacitor 38, thus preparing for the next shutter command.

The invention has been described with reference to a preferred embodiment. However, it will be appreciated that variations and modifications can be effected by a person of ordinary skill in the art without departing from the scope of the invention.

PARTS LIST

- 10 shutter
- 12 shutter blade
- 14 conductive strip
- 16 shutter frame
- 18 springs
- 20 permanent magnet
- 22 guide groves
- 24A, 24B shutter stops
- 26 tabs
- 28 shutter blade aperture
- 30 camera aperture
- 32 shutter control circuit
- 34 camera battery
- 36 capacitor charger circuit
- 38 capacitor
- 40 camera assembly
- 42 shutter activation button
- 50 H-bridge
- 60 H-bridge control circuit
- 70 transistor
- 80 transistor
- 90 transistor
- 100 transistor

What is claimed is:

1. An electromagnetic camera shutter comprising:

an electrically conductive shutter blade;

electrically conductive spring means for urging said shutter blade into a first or a second position from a compressed position between said first and said second position;

permanent magnet means associated with said shutter blade; and control means for applying a current through said springs and said shutter blade in a first direction to generate an electromagnetic field between said shutter blade and said permanent magnet so as to move said shutter blade from said first position to said second position and for applying a current through said springs and said shutter blade in a second direction so as move said shutter blade from said second position to said first position.

2. The electromagnetic camera shutter according to claim 1, wherein said control means is comprised of a charged capacitor, H-Bridge, and H-Bridge control circuitry.

3. An electromagnetic camera shutter comprising:

a shutter blade having a conductive strip mounted thereon for generating a magnetic field when current flows therethrough;

electrically conductive spring means for urging said shutter blade to either a first position or a second position from a position located between the closed and the open position;

said electrically conductive spring means connected in circuit to said conductive strip;

permanent magnet means associated with said shutter blade; and means for applying a current through said conductive spring means to said conductive strip in a first direction for generating an electromagnetic field to move said shutter blade from the first position to the second position and for applying a current through said conductive springs and said conductive strip in a second direction to move said shutter blade from the second position to the first position.

4. The electromagnetic camera shutter according to claim 3, wherein said means for applying current is a chargeable capacitor.

5. The electromagnetic camera shutter according to claim 3, wherein said means for applying a current is comprised of:

a chargeable capacitor;

an H-bridge for controlably connecting said chargeable capacitor to said conductive strip; and H-bridge control means for controlling the direction of connection of the chargeable capacitor to said conductive strip.

* * * * *